United States Patent
Pearson et al.

(10) Patent No.: US 10,156,329 B2
(45) Date of Patent: Dec. 18, 2018

(54) ADAPTIVE LED COVE LIGHTING SYSTEM

(71) Applicant: Tempo Industries, LLC, Irvine, CA (US)

(72) Inventors: Dennis Pearson, Foothill Ranch, CA (US); Michael D. Bremser, Seal Beach, CA (US); James Johnson, Lake Forest, CA (US); Thomas Lueken, Beaumont, CA (US); Shaun Toms, Fontana, CA (US)

(73) Assignee: Tempo Industries, LLC, Irvine, CA (US)

( * ) Notice: Subject to any disclaimer, the term of this patent is extended or adjusted under 35 U.S.C. 154(b) by 0 days.

(21) Appl. No.: 15/953,298

(22) Filed: Apr. 13, 2018

(65) Prior Publication Data

US 2018/0238503 A1    Aug. 23, 2018

Related U.S. Application Data

(63) Continuation of application No. 15/335,401, filed on Oct. 26, 2016.

(60) Provisional application No. 62/320,517, filed on Apr. 9, 2016.

(51) Int. Cl.

| | |
|---|---|
| *F21V 21/088* | (2006.01) |
| *F21V 21/02* | (2006.01) |
| *F21S 8/00* | (2006.01) |
| *F21V 29/70* | (2015.01) |
| *G06Q 10/08* | (2012.01) |
| *G06Q 30/06* | (2012.01) |
| *F21V 3/02* | (2006.01) |
| *F21V 5/04* | (2006.01) |
| *F21Y 115/10* | (2016.01) |
| *F21Y 103/10* | (2016.01) |

(52) U.S. Cl.
CPC ............... *F21S 8/033* (2013.01); *F21V 3/02* (2013.01); *F21V 5/04* (2013.01); *F21V 21/025* (2013.01); *F21V 21/088* (2013.01); *F21V 29/70* (2015.01); *G06Q 10/087* (2013.01); *G06Q 30/0633* (2013.01); *F21Y 2103/10* (2016.08); *F21Y 2115/10* (2016.08)

(58) Field of Classification Search
CPC .. F21S 8/033; F21V 29/70; F21V 3/02; F21V 5/04; F21V 21/025; F21V 21/088; G06Q 10/087; G06Q 30/0633
See application file for complete search history.

(56) References Cited

U.S. PATENT DOCUMENTS

| | | | | |
|---|---|---|---|---|
| 1,249,500 A | * | 12/1917 | Richter | ............... F21S 8/033 |
| | | | | 362/147 |
| 2009/0135597 A1 | * | 5/2009 | Kay | ............... F21K 9/00 |
| | | | | 362/247 |
| 2016/0327250 A1 | * | 11/2016 | Czech | ............... F21V 17/02 |

FOREIGN PATENT DOCUMENTS

EP      2927563 A1 * 10/2015  ............. F21S 8/033

* cited by examiner

*Primary Examiner* — Bao Q Truong
*Assistant Examiner* — Nathaniel Lee
(74) *Attorney, Agent, or Firm* — Lapple Ubell IP Law, LLP; Franklin D. Ubell

(57) ABSTRACT

An LED cove light system having a wall piece mounted to a back surface of a cove, the wall piece having a top edge which is at the same height as a top surface of a front wall of the cove. A light fixture component is removably attachable at an angle to the wall piece and carries one or more LEDs positioned to project light from the cove out into an adjacent space of a room.

3 Claims, 19 Drawing Sheets

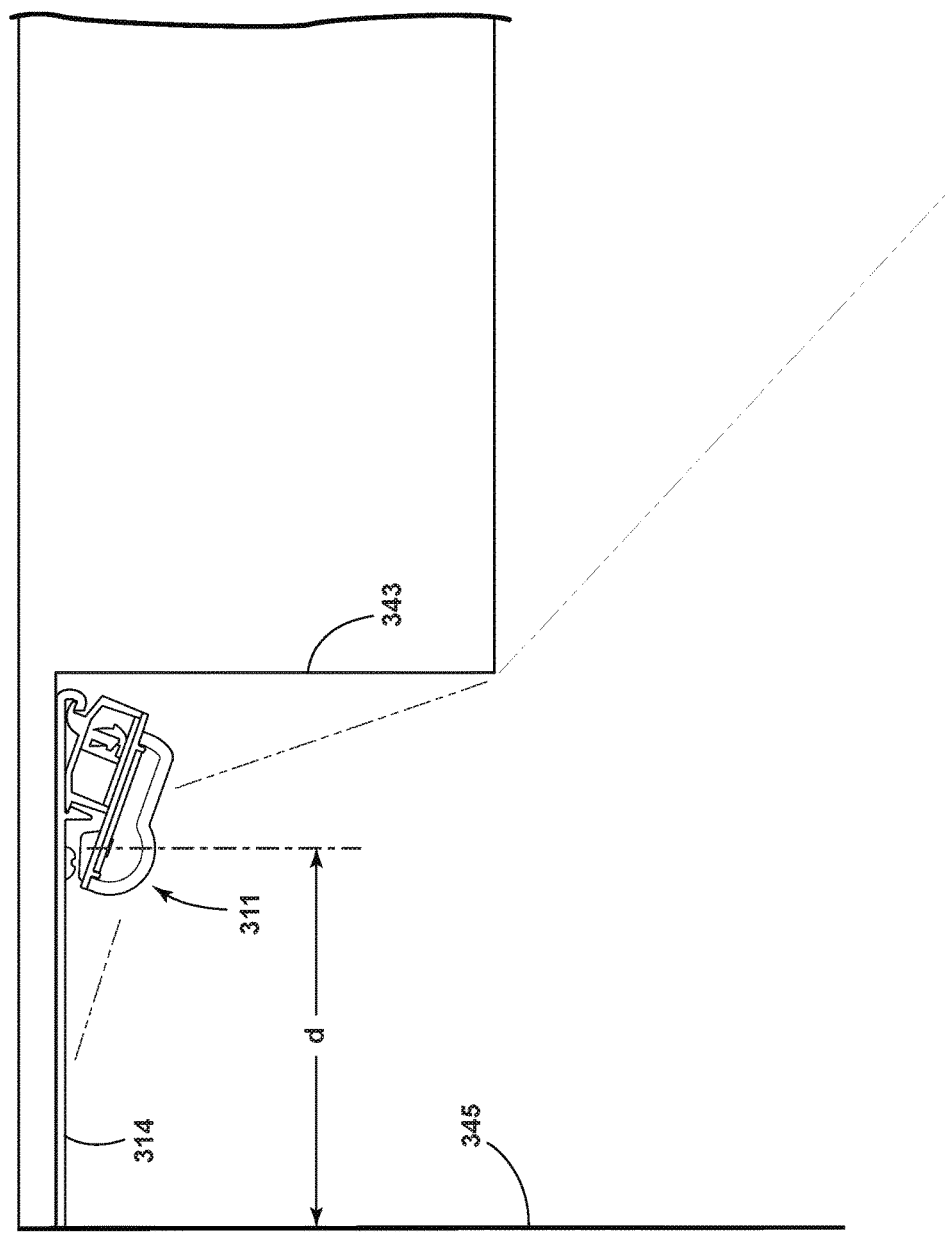

ADAPTIVE LED COVE LIGHTING SYSTEM

RELATED APPLICATIONS

This application is a continuation of and claims the benefit and priority of and to U.S. patent application Ser. No. 15/335,401, filed Oct. 26, 2016, entitled Adaptive LED Cove Lighting System, which claims the benefit of and priority to U.S. Provisional Patent Application Ser. No. 62/320,517, filed Apr. 9, 2016, also entitled, "Adaptive LED Cove Lighting System." The contents of both of these applications is hereby incorporated by reference herein in their entireties

FIELD OF THE DISCLOSURE

The subject disclosure relates to LED electric lighting fixtures, and more particularly to LED light fixture apparatus configured to project light from a cove or other architectural feature into an adjacent room space.

DESCRIPTION OF RELATED ART

Various LED electric light fixtures have been constructed in the past, for example, such as those disclosed in U.S. Pat. Nos. 7,726,840 and 8,864,347, both assigned to Tempo Industries, LLC.

SUMMARY

An illustrative LED cove light system may comprise a wall piece mounted to a back surface of a cove and having a top edge which is at the same height as a top surface of a front wall of the cove. A light fixture component is removably attachable at an angle to the wall piece and carries one or more LEDs positioned to project light from the cove out into an adjacent space of a room. In an illustrative embodiment, the one or more LEDs are mounted near a top edge of the light fixture component but at or beneath the level of the top surface of the front wall of the cove.

Illustrative embodiments further provide a method of illuminating a surface comprising constructing a wall piece and configuring the wall piece to be mountable to a cove wall surface perpendicular to a surface to be illuminated and configuring a light fixture component and the wall piece to be to attachable together such that one or more LEDs in the light fixture component are positioned at an angle selected to project light from the LEDs on the surface to be illuminated. The wall piece is then attached to a wall, and the light fixture component is attached to the wall piece such that each of the one or more LEDs is spaced at a selected distance from the surface to be illuminated. Illustrative methods further contemplate attaching the wall piece to a structural surface of predictable integrity so that planned light distributions are not altered during the construction phase of building projects. Overall, an end user is assured a predictable, controlled lighting effect.

DESCRIPTION OF THE DRAWINGS

FIG. 20 is a schematic diagram illustrating a wall wash application of an illustrative embodiment.

DETAILED DESCRIPTION OF ILLUSTRATIVE EMBODIMENTS

Figure 1:
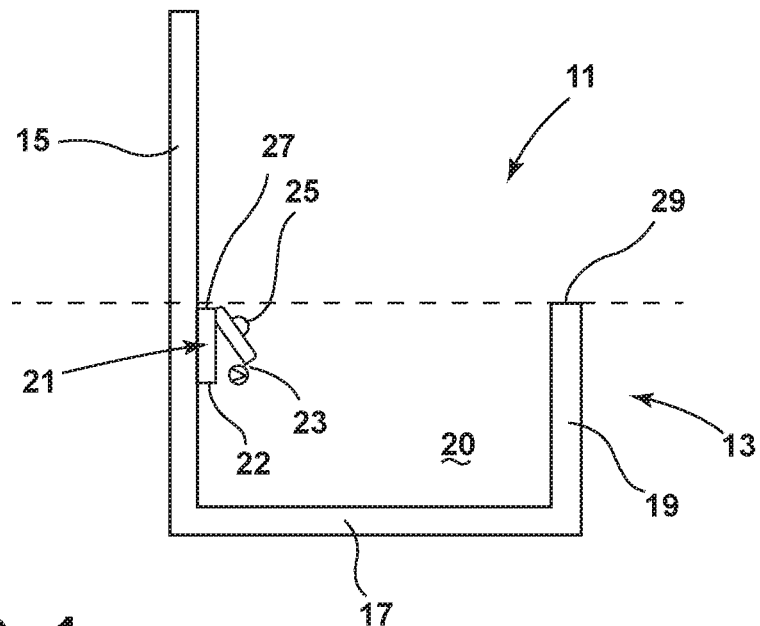
FIG. 1 is a schematic side view of an LED cove light system according to an illustrative embodiment.

An illustrative embodiment of an LED cove light system 11 is shown in FIG. 1. In particular, FIG. 1 illustrates a cove 13 having a back wall 15, a front wall 19, and a bottom 17, which, in the illustrative embodiment, form a channel 20 of rectangular cross-section. In illustrative embodiments the front wall 19, may be, for example, 2 to 6 inches high.

In the illustrative embodiment of FIG. 1, a cove light fixture 21 is attached to the back wall 15. The illustrative cove light fixture 21 includes a wall piece or mounting track 22 and an LED fixture component 23, which carries one or more LEDs, LED modules, or LED lighting devices, e.g. 25. In an illustrative embodiment, the top edge 27 of the wall piece 22 lies at the same height as the top edge 29 of the front wall 19 of the cove 13. In some embodiments, the wall piece 22 may be constructed of thermally conductive plastic or a composite polycarbonate.

In an illustrative embodiment, the LED light fixture component 23 is constructed to clip on to the wall piece 22 at a predetermined fixed angle of, for example, 20 degrees to the horizontal, and the one or more LEDs 25 are positioned as high as possible toward the top edges 27, 29. In one embodiment, adjacent fixture units are shipped clipped together and include a length adjustment feature, which allows the overall length of a number of interconnected units to be adjusted.

Figure 3:
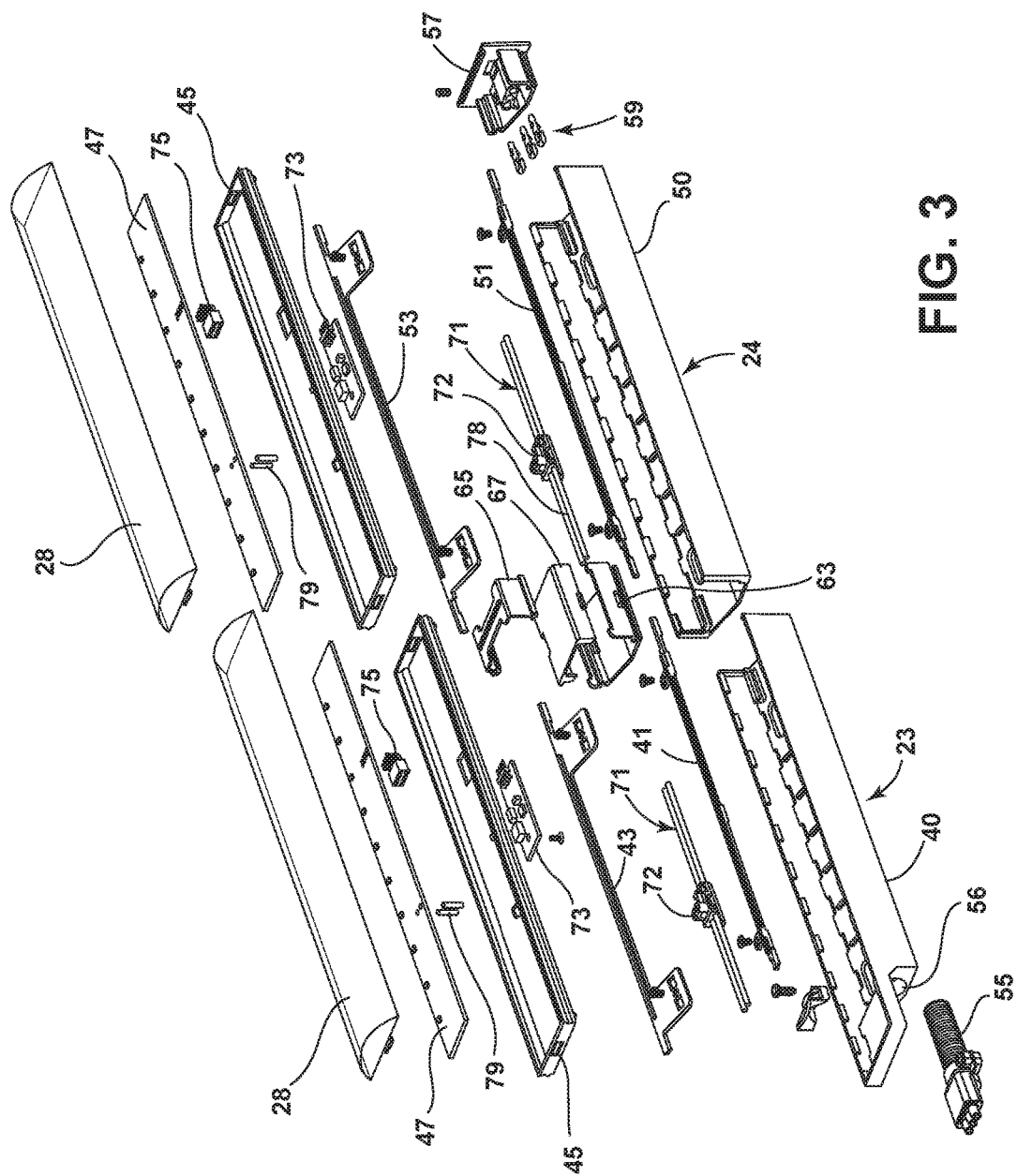
FIG. 3 is an exploded perspective view of illustrative light fixture modules for implementing an illustrative system according to FIG. 1.

In an illustrative embodiment, each LED light module 23 directs LED-generated light through a respective lens 28 (FIG. 3). As known in the art, in various embodiments, lenses 28 may be used to tailor the light output pattern of the LEDs 25 in a desired manner. In various embodiments, lenses 28 may also protect the LEDs 25 and/or assist in sealing the modules 23, 24.

Figure 2:
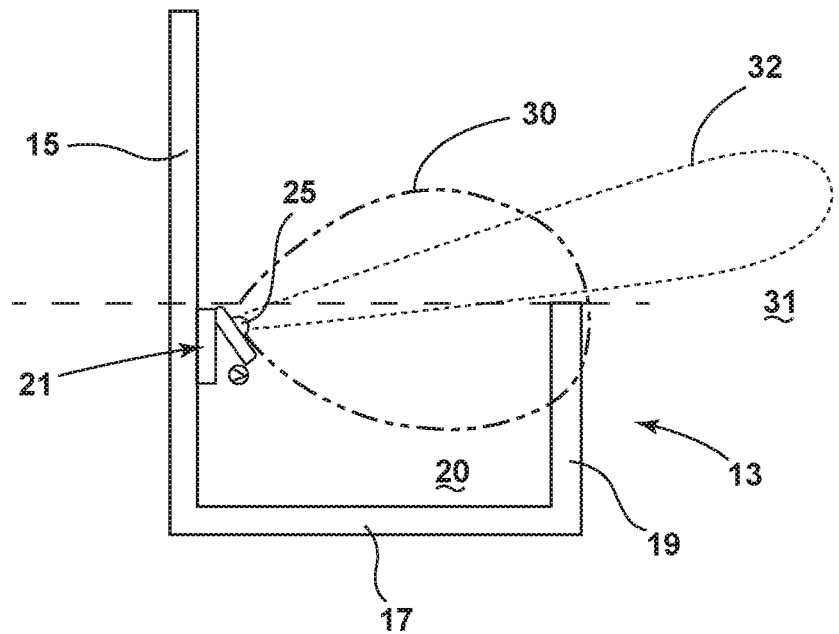
FIG. 2 is a schematic diagram illustrating light distribution patterns according to an illustrative embodiment of the cove light system of FIG. 1.

In illustrative embodiments, the system is configured to optimize the distribution of available light in a pattern 32 such as illustrated in FIG. 2. In such systems, optics may be used to assist in projecting light from the cove 13 out into the room 31 to contribute to the useable ambient light in the space, to provide a more pleasing effect to the eye, to eliminate the possibility of glare, and to assist in meeting modern energy codes and requirements (e. g. ASHRAE 90.1) requiring a certain power density (W/sq ft) that can be attributed to lighting. Optics may be employed, for example, to shift the normal light distribution pattern 30 to a more desirable distribution, e.g. 32. In illustrative embodiments, the light distribution may varied by changes in the lens 28 or the addition of a reflective surface positioned below the LEDs 25 and attached to the printed circuit board 47.

An illustrative embodiment of a pair of adjacent light fixture modules 23, 24 of an illustrative system is shown in FIG. 3. The first module 23 includes a base component 40, left and right shield components 43, 53, a module top 45, a printed circuit board (PCB) 47, and a dome lens 28. The second module 24 includes a power through base component 50, left and right shields 51, 53, a module top 45, a PCB 47 and a dome lens 28. The respective module tops 45 close the respective base components 40, 50 and receive and mount the PCB's 47. The respective left and right shields 43, 53 cover holes in the bottom of base component 40 in order to be compliant with U.L. listing requirements for electrical safety since line voltage wires pass through the cavity formed by components 40 and 45 and attach to the input PCBA 73.

Figure 10:
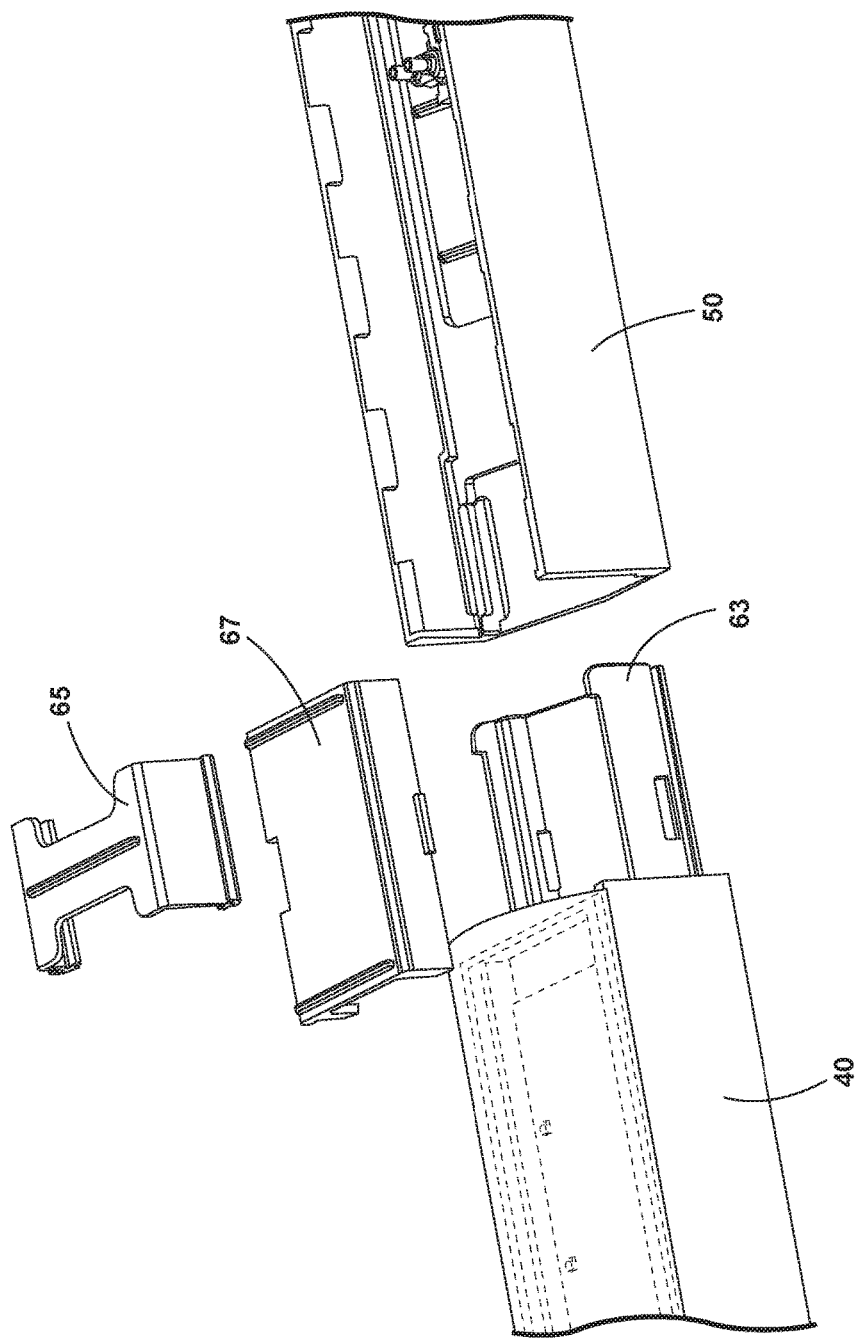
FIG. 10 is a partial perspective view further illustrating apparatus for interconnecting adjacent light fixture modules according to an illustrative embodiment.

The left and right light fixture modules 23, 24 are connected together by an interconnection assembly which enable the modules 23, 24 to move linearly towards and away from each other to allow the distance between the modules 23, 24 to be adjusted. FIG. 3 illustrates one embodiment of such an interconnection assembly, which includes an extension-reduction slide component 63, an extension retaining clip 65, and a wireway cover 67. These components are further illustrated in FIG. 10. Embodiments of an interconnection assembly enabling linear movement of adjacent modules are also taught in U.S. Patent Publication 2014/0307438, published Oct. 16, 2014, which Patent Publication is incorporated by reference herein in its entirety.

A.C. power is introduced into the first module 23 by a male 3-pin connector assembly 55, which plugs into an opening 56 in the base 40. A.C power may then exit the second base 50 via a female end cap 3-pin connector 57, which may cooperate with three female receptacles 59. Power is supplied to each of two female in-line connector assemblies 72 and from there to respective A.C. power board assemblies 73. The power board assemblies 73 supply conditioned A.C. power to the respective PCB's 47 via respective 4-pin by two-row connectors 75. Male power pins 79 provide the return from the PCB's 47 to the A.C. wires 71 via the respective connectors 72. The A.C. power feed and conditioning circuitry in the illustrative embodiments may be constructed as disclosed in U.S. patent application Ser. No. 14/941,476, filed Nov. 13, 2015, and entitled "Compact A.C. Powered LED Light Fixture", which application is incorporated by reference herein in its entirety.

Figure 4:
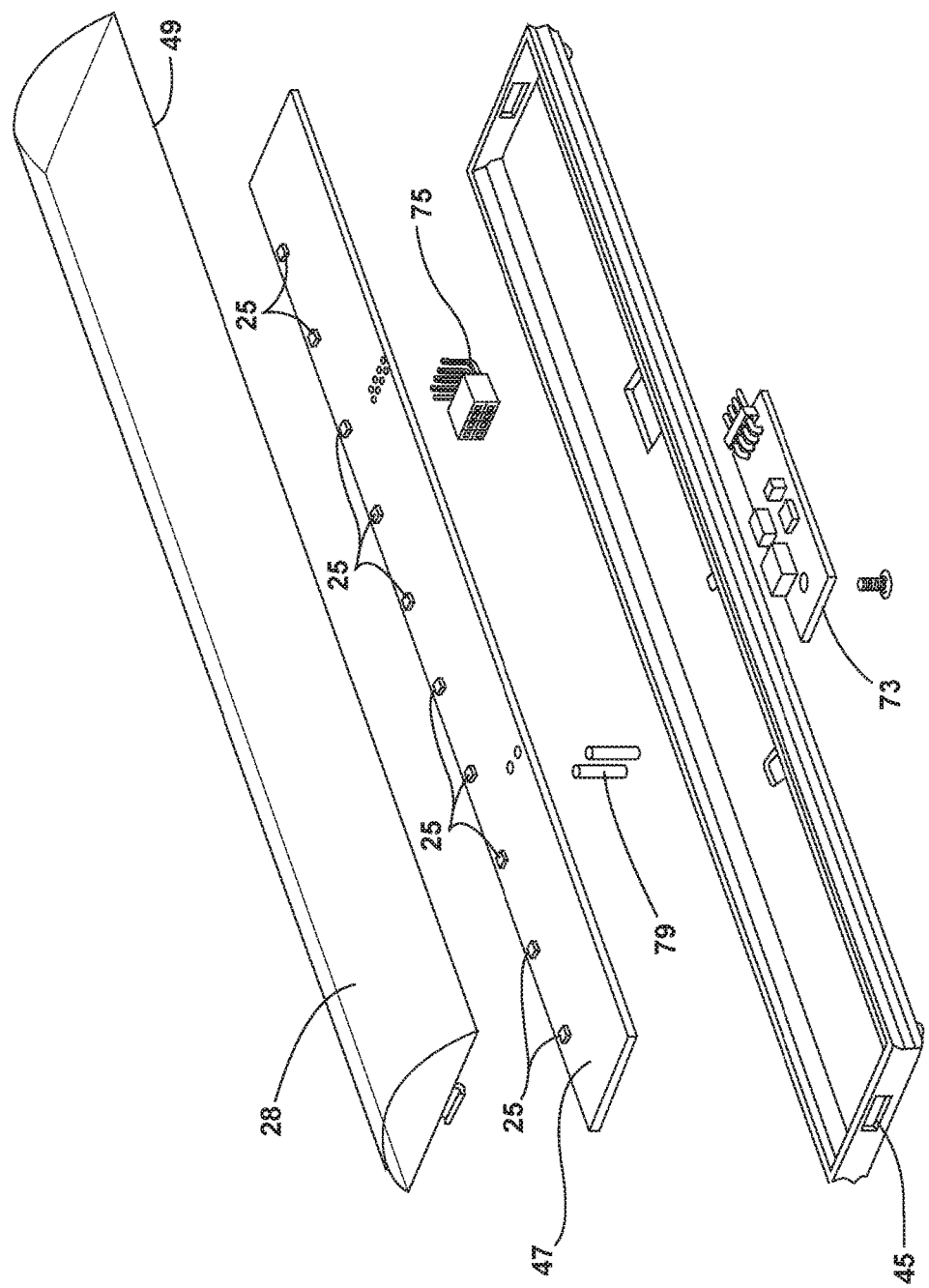
FIG. 4 is an exploded perspective view illustrating LED placement according to one illustrative embodiment.
Figure 5:
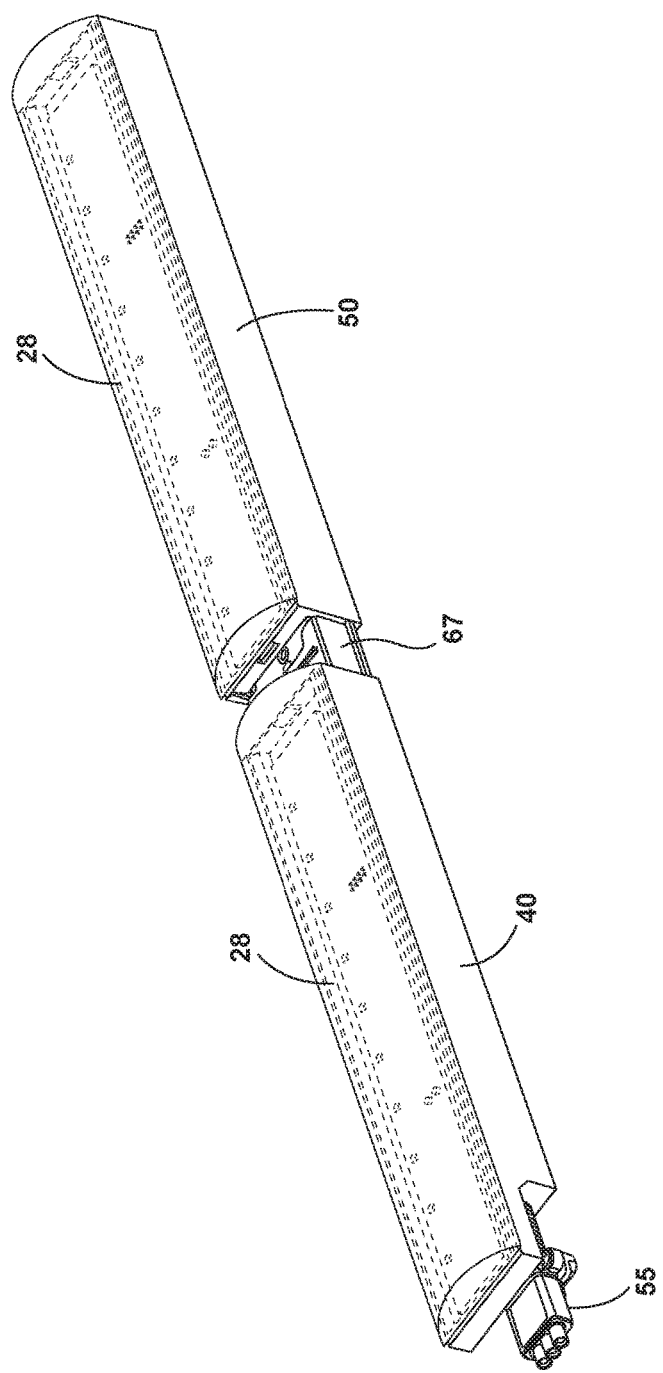
FIG. 5 is a top perspective view of the modules of FIG. 3 in an assembled state.

FIG. 4 illustrates a circuit board 47 and associated components in more detail. In the illustrative embodiment of FIG. 4, the LEDs 25 are arranged linearly along an upper edge of the board 47 and space equally apart. In one embodiment, the LEDs 25 may be Nichia 757 type LEDs, 0.5 Watts. This positioning of the LEDs 25 assists in obtaining various desired light distribution patterns by placing the LEDs 25 near or at the height level of the front cove wall 19 (FIG. 1). In one embodiment, the LEDs 25 may be positioned one half inch below the top edge 29 of the cove wall 19.

Figure 6:
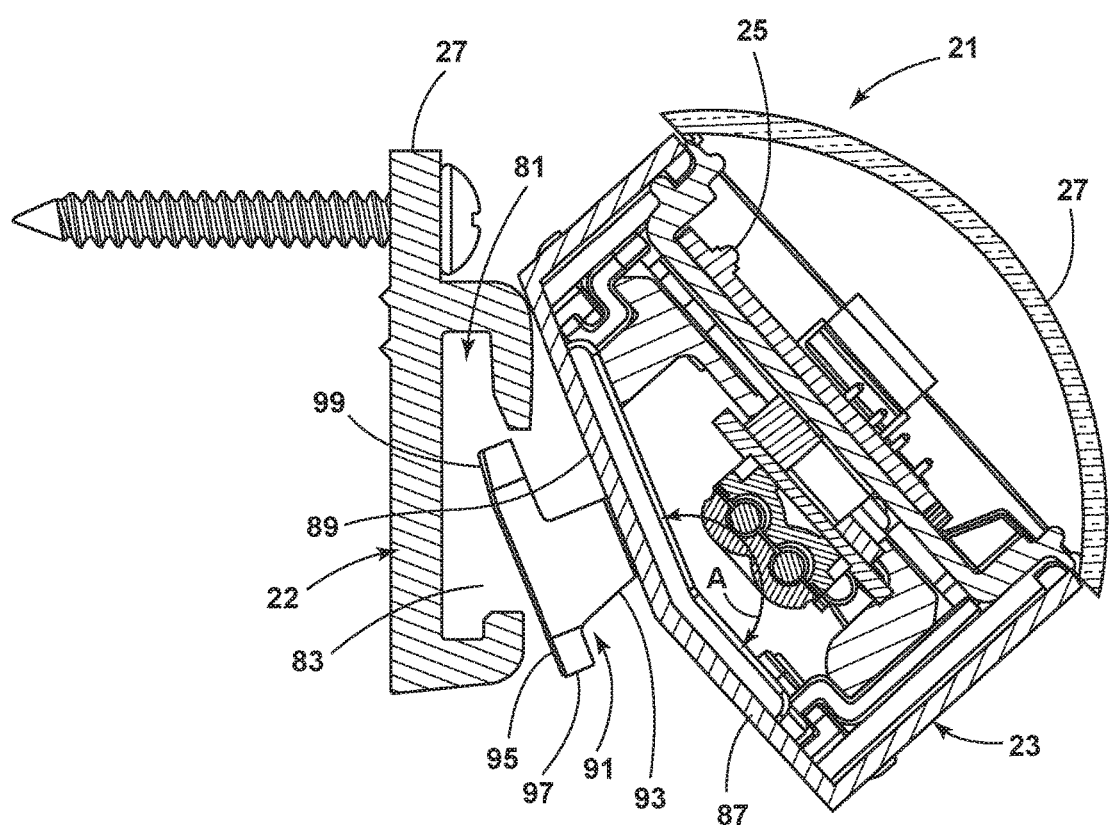
FIG. 6 is a side sectional view illustrating a first step in a procedure for attachment/installation of a light fixture module to a wall piece according to an illustrative embodiment.
Figure 7:
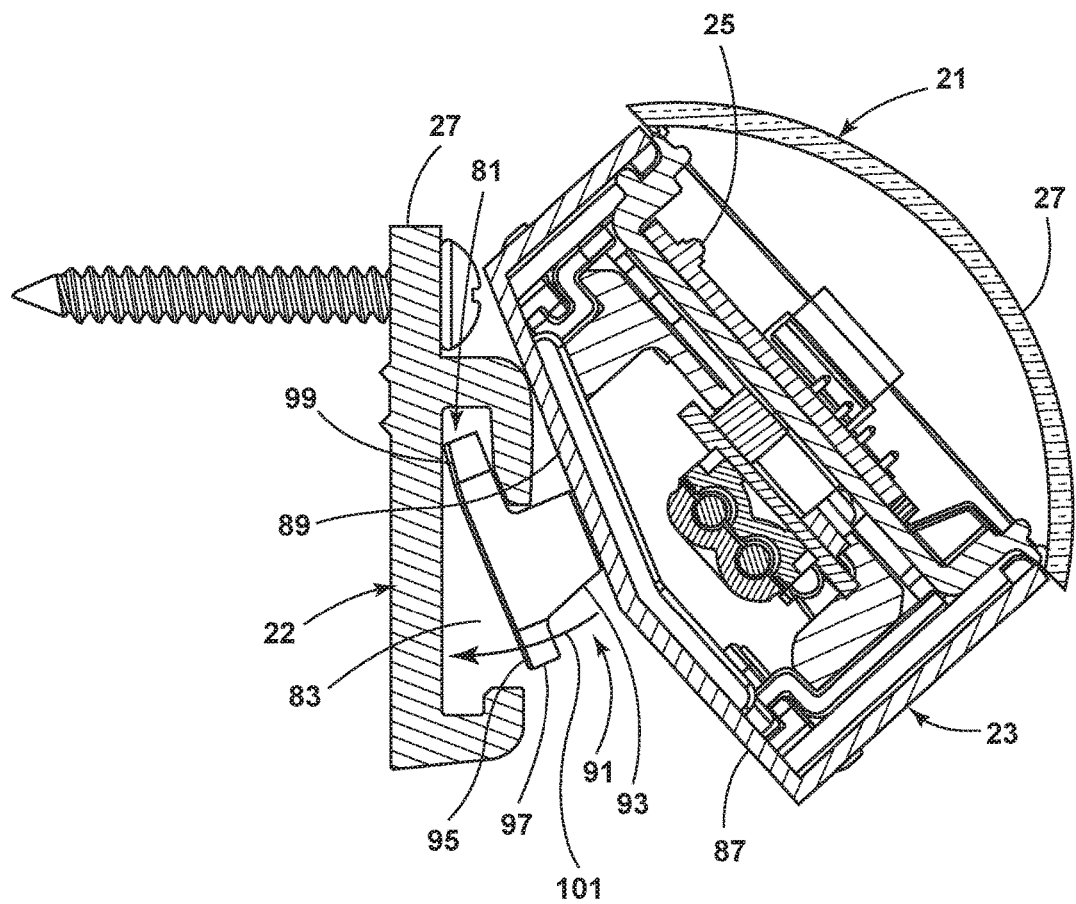
FIG. 7 is a side sectional view illustrating a second step in the procedure of FIG. 6.
Figure 8:
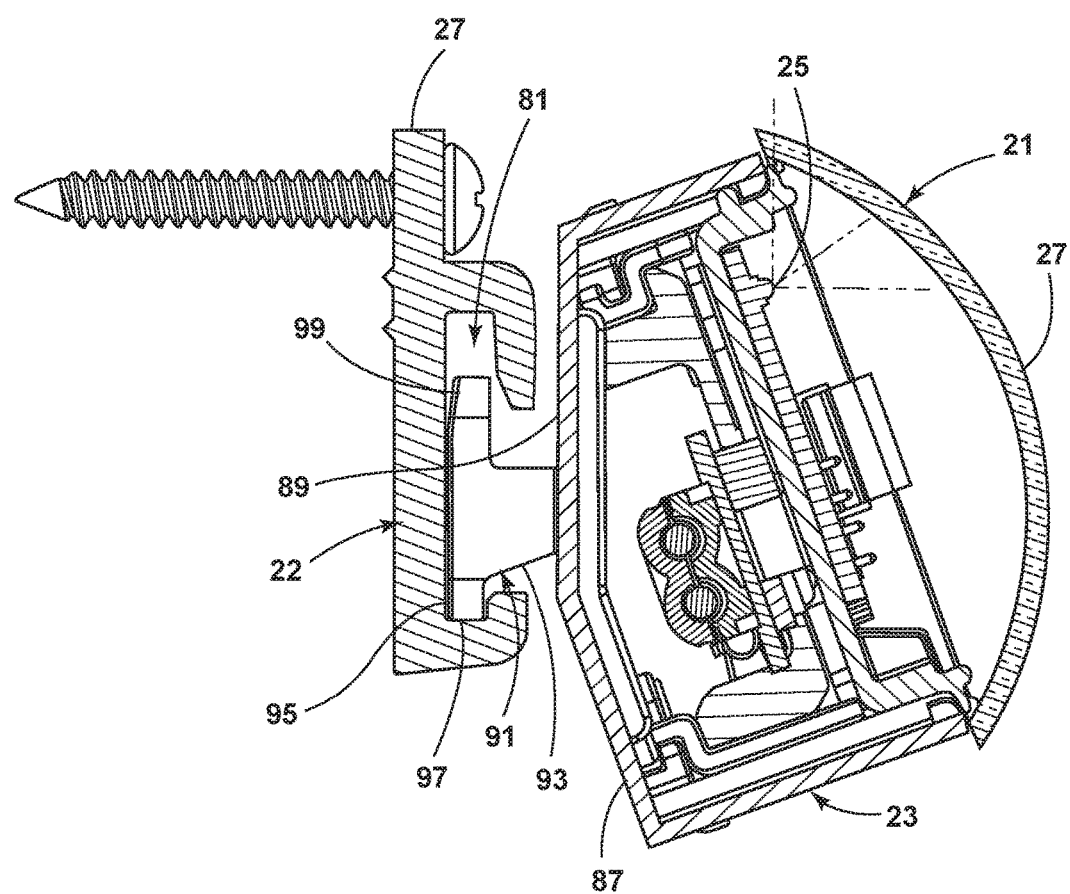
FIG. 8 is a side sectional view illustrating a third step in the procedure of FIG. 6.

FIGS. 6-8 show an illustrative embodiment of an interconnection mechanism for joining a wall piece 22 and a light fixture module, e.g. 23. As seen in FIG. 6, the wall piece 22 has a central channel 81 of generally rectangular cross-section having an open entry way 83. The bottom surface 85 of the light fixture module 23 is cantilevered to have linear lower and upper segments 87, 89 which meet an obtuse angle "A." A latch member 91 is attached to the upper segment 89 and has a leg 93 and a foot 95. In one embodiment, the channel 81 runs the entire length of the wall piece 22, and the foot 95 is positioned at two locations on the light fixture module 23. This need not be the case in other embodiments.

As illustrated in FIGS. 6-8, the latch member 91, channel 81 and entry way 83 are so shaped and dimensioned that the upper end 99 of the foot 95 may be inserted into the upper end of the channel 81, which enables the lower end 97 of the foot 95 to swing into the channel 81, as indicated by arrow 101 in FIG. 7. Once in the channel 81, the foot 95 may be dropped down into the interconnected or attached position shown in FIG. 8. In this position, the LED 25 is disposed at a selected angle, for example, 20 degrees to the horizontal, as discussed above. The cantilevered bottom surface on the light fixture module 23 facilitates this interconnection mechanism. In this manner, a tool-less interconnection and installation of the light fixture module 23 and the wall piece 22 is achieved.

Figure 9:
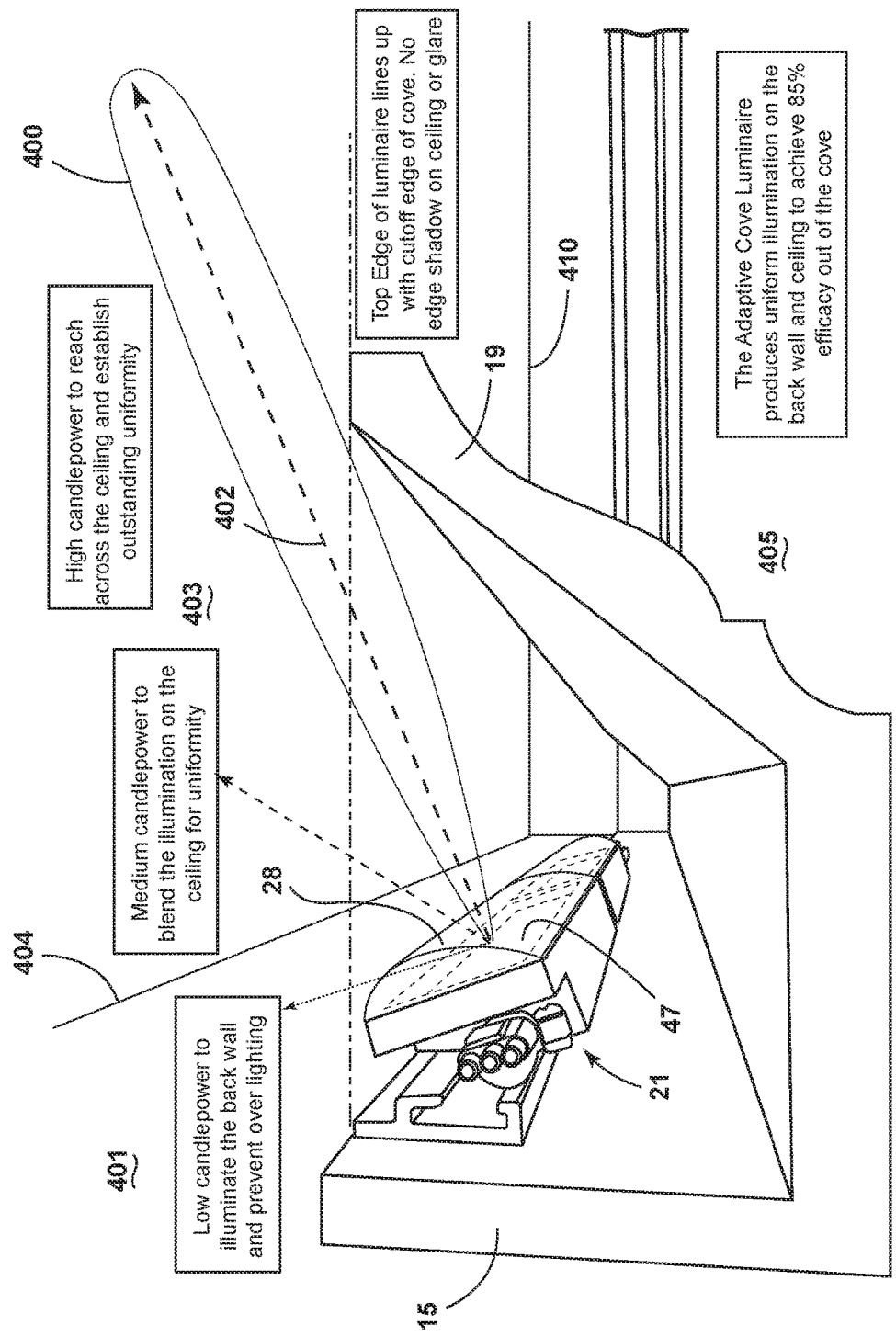
FIG. 9 is a schematic diagram illustrating a light distribution pattern achieved according to illustrative embodiments.

FIG. 9 illustrates a lighting pattern achievable according to illustrative embodiments in a room with vertical walls 401, 405 lying perpendicular to a ceiling 403. The vertical walls 401, 405 meet with the ceiling 403 at respective edges 404, 410. The vertical cove back wall 15 lies against the vertical wall 401.

In FIG. 9, the Candela curve of maximum intensity 400 forms about a line 402 perpendicular to the surface of the circuit board 47 carrying the LEDs 25; however those skilled in the art will appreciate that this maximum intensity direction can be altered by the use of optics. In connection with FIG. 9, 85% efficacy is the ratio of the "useful" light which illuminates a desired surface (i.e. visible to the observer) to that of the light emitted from the luminaire (some of which is lost in the lens 28). The terms low, medium and high candle power are used qualitatively because the brightness on the relevant surface (i.e. ft.-cd) goes as the inverse of the distance squared. Thus, to "throw" light further and achieve the same ft.-cd, one needs to start with higher candle power, as would be appreciated by those skilled in the art.

To elaborate, the fundamentals of uniform lighting are primarily based on the ratio of intensity in the direction from the source to the task. A source that is aimed directly at a task is easily expressed as the Candela (Candlepower) divided by the distance to the task squared, $(Cp/D^2)$. When the task is not directly lit from the source, a cosine factor of the angle along with the distance to the task determines the foot-candles and therefore the uniformity ($Cp/D^2*\cos \angle$). To obtain perfect uniformity, the intensity (Candela) from the source to the outer reaches of the task must be substantially higher than the intensity toward the closest area of the task. Essentially, the light toward the farthest area needs to be ten times that of the closest area with the mid-range blending from low to high in order to achieve good uniformity. The human eye can notice a lighting ratio of approximately 3:1, therefore, good uniformity with no shadows or hot spots would be considered outstanding.

Figure 11:
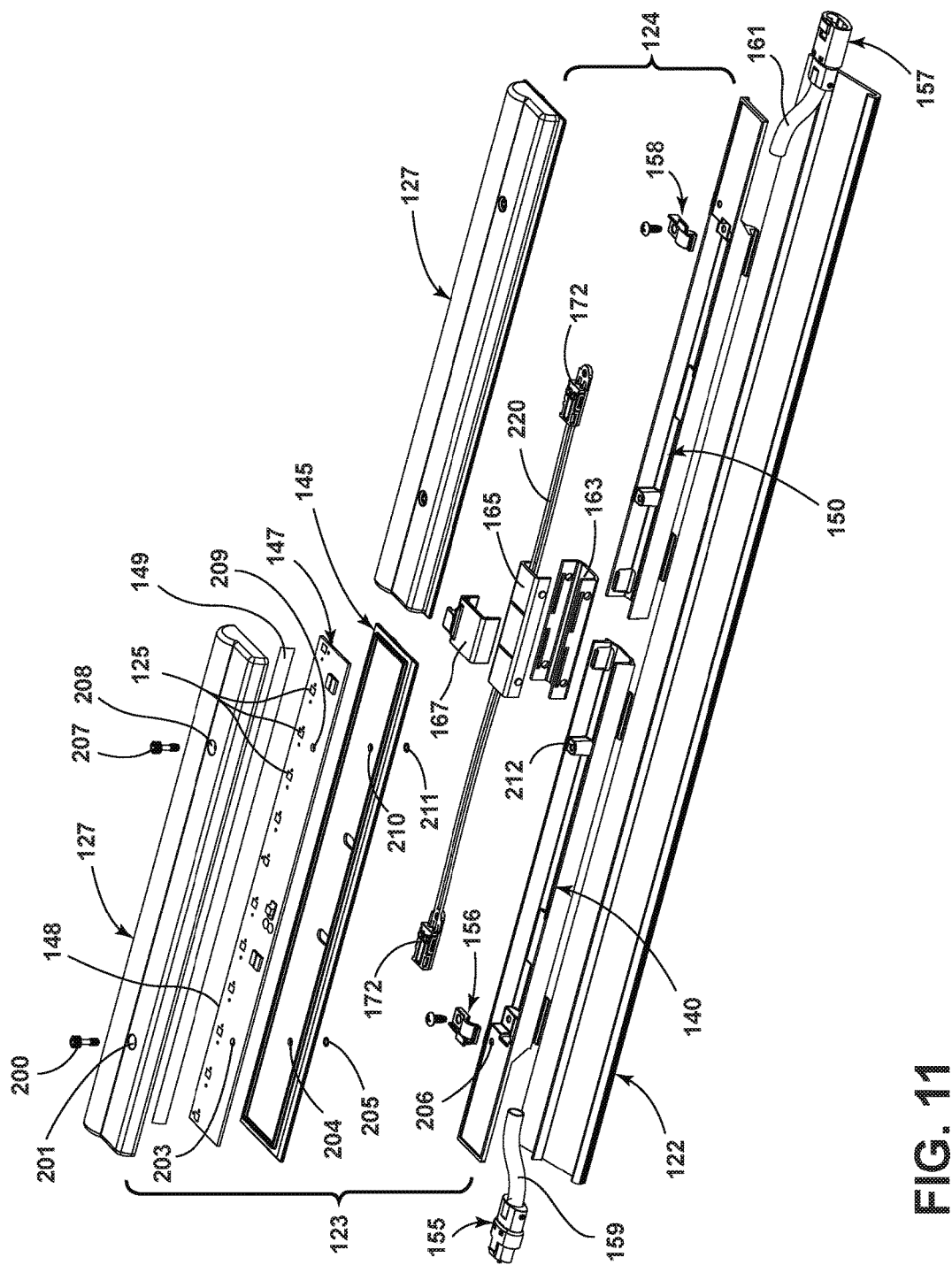
FIG. 11 is an exploded perspective view of a second illustrative light fixture embodiment.

A second illustrative embodiment of a pair of adjacent light fixture wireway modules 123, 124 of an illustrative system is shown in FIG. 11. The first light fixture wireway module 123 includes a first base component 140, a heat sink 145, a printed circuit board (PCB) 147, and a lens 127. The second light fixture wireway module 124 includes a second base component 150 and a lens 127. The second light fixture wireway module 124 also includes a heat sink and a PCB, which may be constructed and positioned identically to heat sink 145 and PCB 147, but which are not shown for purposes of clarity of illustration. The respective heat sinks, e.g. 145, close the respective first and second wireway module components 140, 150 and receive and mount the PCB's 147.

In an illustrative embodiment, the heat sinks, e.g. 145, comprise generally rectangular trays, which snugly receive the PCB's, e.g. 147. The PCB 147 may be attached to the trays, for example, mechanical fasteners 200, 207, or in other embodiments by thermally conductive adhesive tape. In illustrative embodiments, the base component 140 comprises a power input base and the base component 150 comprises a power output base. The PCB 147 may comprise an LED board mounting one or more LEDs. In one embodiment, the PCB 147 may mount twelve LEDs in a row, each of which collectively receive up to 10 watts of power at 120 volts A.C.

Further in FIG. 11, a first captive panel screw 200 inserts through holes 201, 203, and 204, then through a retainer ring 205, which holds screw 200 captive upon removal of the heat sink 145 from the base 140, and finally threads into a hole 206 in a top surface of the first base component 140. Similarly, a second captive panel screw 207 inserts through holes 208, 209, 210, then through a retainer ring 211 and finally threads into a hole 212 in a boss 213 formed on an inner side surface of the first base component 140.

Figure 13:
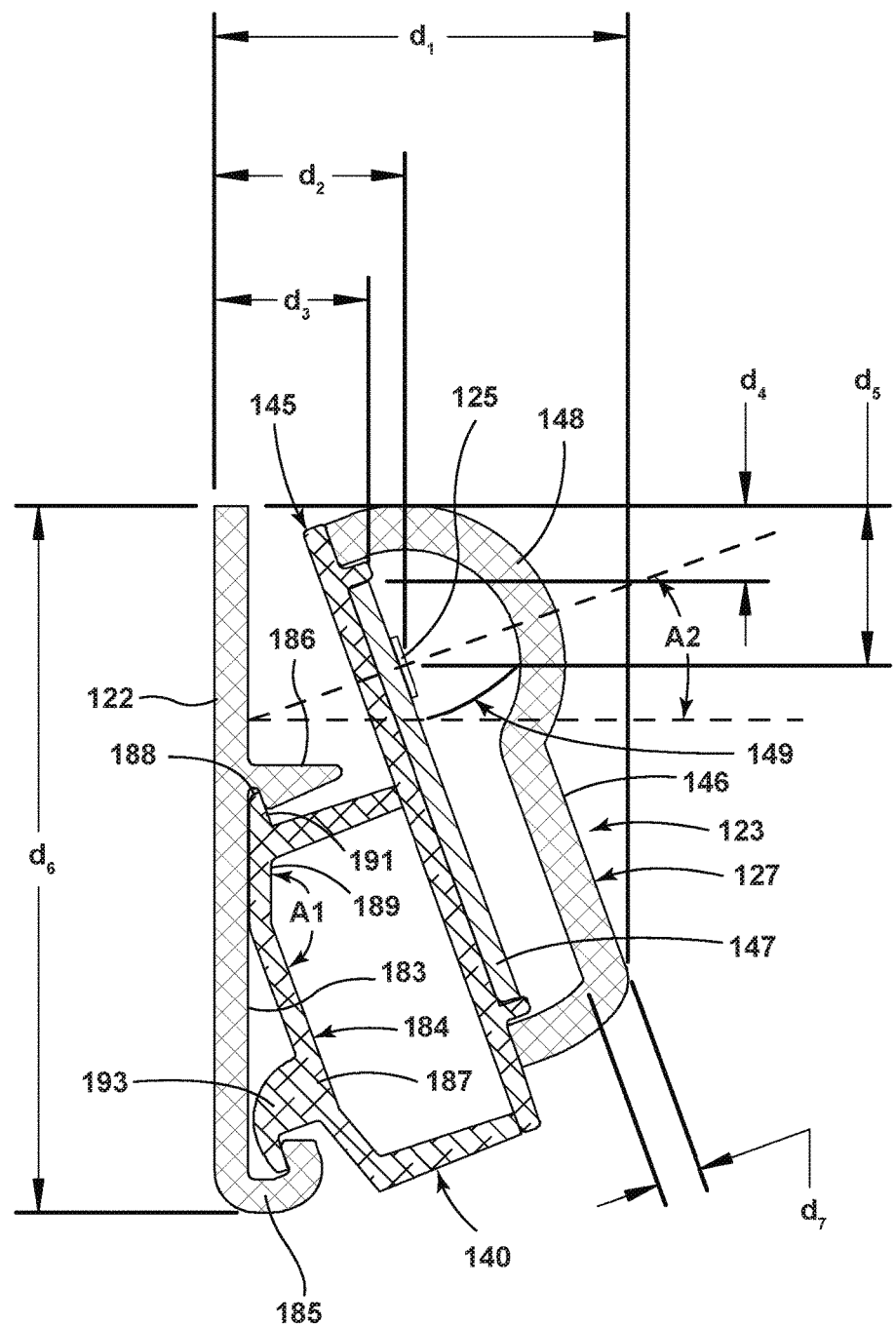
FIG. 13 is a side sectional view of the embodiment of FIG. 11 in an assembled state.
Figure 14:
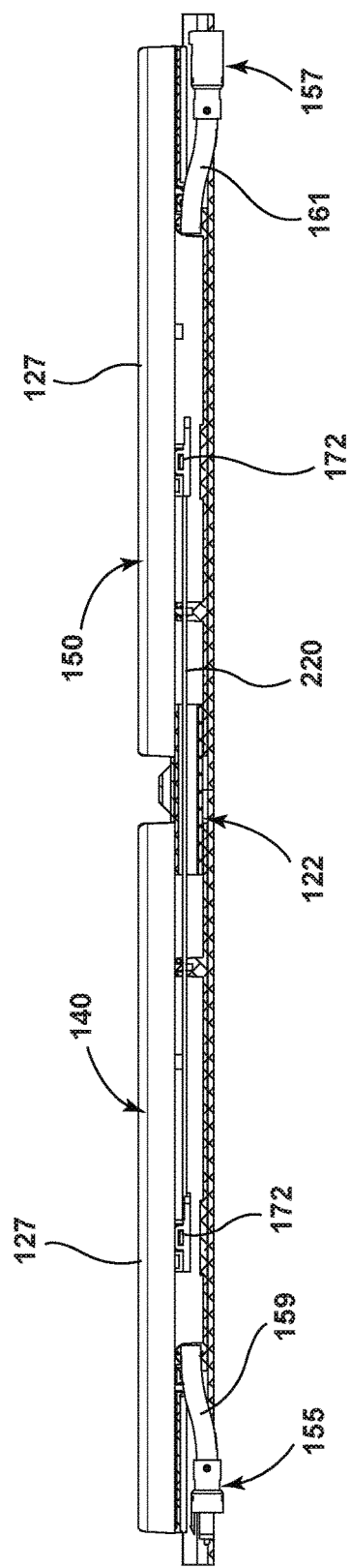
FIG. 14 is a side view of the embodiment of FIG. 11 in an assembled state.

Further in an illustrative embodiment, each lens 127 has a flat portion 146 and an arcuate portion 148 (FIG. 13). In the illustrative embodiment, the arcuate portion 148 has a constant radius so as to avoid sharp edges which would generate non-uniformity in the distributed light, i.e. artifacts or a "prism effect." In one embodiment, the arcuate portion 148 has no "optic" effect on the light passing through it, but in other embodiments could provide an optic effect, for example, to generate a primary beam like that shown in FIG. 9. In typical embodiments, the thickness of the lens 127 is determined by the selected lens material and U.L. requirements.

The illustrative embodiment of FIG. 11 further includes a reflector component 149, which may be made of, for example, metal or a reflective coated plastic. In one embodiment, the reflector 149 may have a parabolic contour. As may be appreciated from FIG. 13, the reflector component 149 is positioned beneath the LEDs 125 so as to redirect light from the LEDs 125 in an upward direction, thereby assisting in reflecting more useful light out of the light fixture module 123.

In one embodiment, the left and right light fixture modules 123, 124 are connected together by an interconnection assembly which enable the modules 123, 124 to move linearly towards and away from each other to allow the distance between the modules 123, 124 to be adjusted, while at the same time meeting safety requirements for shielding a line voltage cable 220 as it passes between the respective base components 140, 150.

Figure 15:
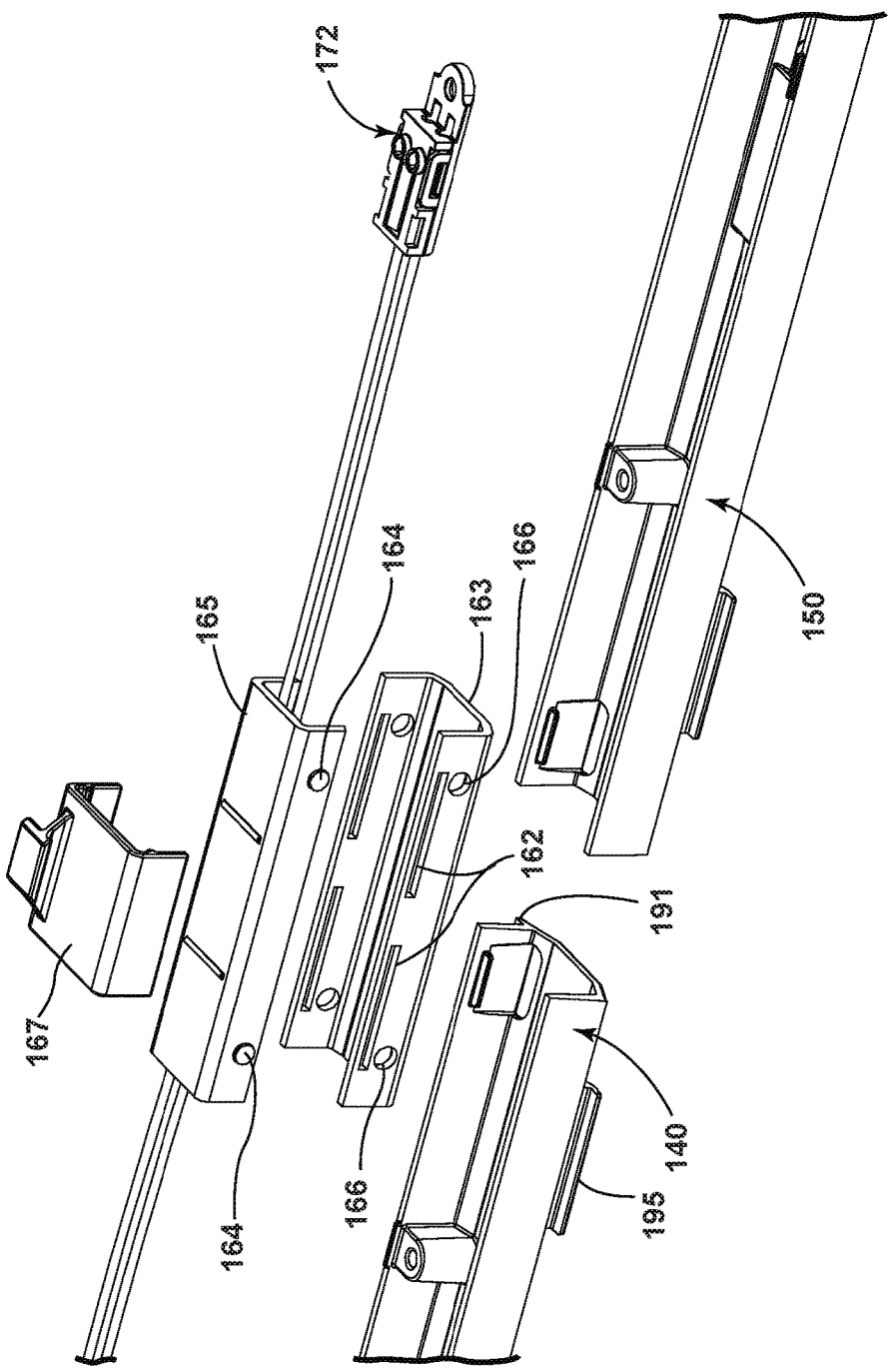
FIG. 15 is a second enlarged view of a portion of the embodiment of FIG. 11.

FIG. 15 illustrates one embodiment of such an interconnection assembly, which includes a wire transfer base component 163, a wire transfer cover 165 and a clip-on spacer 167. In one embodiment, the ridges, e.g. 162, on each outer side of the wire transfer base 163 ride in complementary slots formed on the inner sides of the base components 140, 150, allowing the wire transfer base 163 to slide in and out with respect to the base components 140, 150, to thereby vary the distance between the respective base components 140, 150. Bosses, e.g. 164, on the outside of the wire transfer cover 165 snap into oppositely disposed holes 166 in the wire transfer base 163. The wireway cover 167 snaps into place and holds the base components 140, 150 a fixed distance apart, for example, for shipping purposes.

In various embodiments, the wireway cover 167 may be removed to permit the distance between the base components 140, 150 to be decreased, after which the base components 140, 150 may be screwed or otherwise fastened to an adjacent surface to fix them into place at the selected separation distance. Thus, illustrative embodiments provide a linear collapsing feature, which can assist in accommodating shorter than expected wall lengths. Embodiments of an interconnection assembly enabling linear movement of adjacent modules are also taught in U.S. Patent Publication 2014/0307438, published Oct. 16, 2014, which Patent Publication is incorporated by reference herein in its entirety.

With reference to FIG. 11, A.C. power is introduced into the first light fixture module 123 by a male 3-pin connector 155. The electrical cable 159 which exits the connector 155 is attached by a cable clamp 156 to the power input base 140 and then is clamped by and electrically connected to an electrical connector 172.

A.C. power exits the power output base 150 via a female 3-pin connector 157 whose cable 161 electrically interconnects with a second electrical connector 172 and is clamped in position by a cable clamp 158. In various embodiments, the electrical connectors 172 may be fabricated of first and second halves arranged to pierce the insulation of the electrical cables 159, 161, for example, as illustrated in U.S. Pat. No. 9,458,995, incorporated by reference herein.

In one illustrative embodiment, the electrical connectors 172 are connected to A.C. power supply and conditioning circuitry like that illustrated in FIG. 1 where power is supplied to each of two female in-line connector assemblies 72 and from there to respective A.C. power board assemblies 73. The power board assemblies 73 supply conditioned A.C. power to the respective PCBs 147 via respective 4-pin by two-row connectors 75. Male power pins 79 provide the return from the PCB's 147 to the A.C. wires 71 via the respective connectors 72. The A.C. power feed and conditioning circuitry may be constructed as disclosed in U.S. patent application Ser. No. 14/941,476, filed Nov. 13, 2015, and entitled, "Compact A.C. Powered LED Light Fixture," which application is incorporated by reference herein in its entirety.

In the illustrative embodiment of FIG. 11, the LEDs 125 are arranged linearly along an upper edge of the board 147 and spaced equally apart. In one embodiment, the LEDs 125 may be Nichia 757 type LEDs, 0.5 Watts. This positioning of the LEDs 125 assists in obtaining various desired light distribution patterns, for example, by placing the LEDs 125 near or at the height level of a cove wall, such as the cove wall 19 of FIG. 1. In one embodiment, the LEDs 125 may be positioned one-half inch below the top edge 29 of the cove wall 19.

Figure 12:
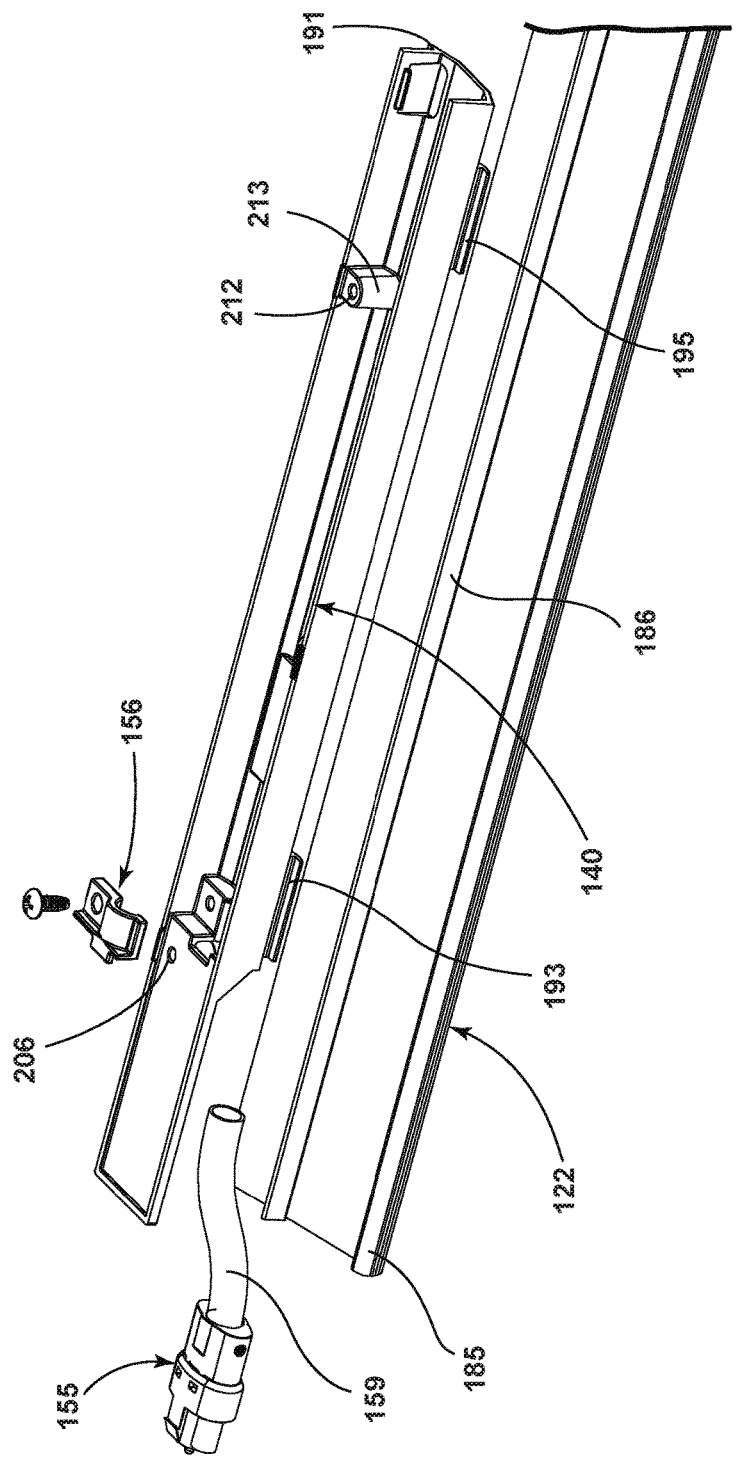
FIG. 12 is an enlarged view of a portion of the light fixture embodiment of FIG. 11.

FIG. 13 shows an illustrative embodiment of an interconnection mechanism for interconnecting a wall mount hanger or wall piece 122 with a light fixture module, e.g. 123. As seen in FIG. 13, the vertically disposed wall piece 122 has a front surface 183, which forms into a bottom hook portion 185. A projection 186 from the side of the wall piece 122 further defines a horizontally running groove 188. A bottom surface 184 of the light fixture module 123 is shaped to have linear lower and upper segments 187, 189 which meet an obtuse angle "A1." A lip 191 is formed on the upper segment 189 and fits into the groove 188. In one embodiment, the groove 188 runs the entire length of the wall piece 122, and the lip 191 runs the entire length of the light fixture module 123. In one embodiment, first and second hooks 193, 195 are formed on the lower segment 187 (FIG. 12) and interlock or engage with the bottom hook 185 of the wall piece 122.

In one embodiment, the LEDs 125 are disposed at an angle A2 of 20 degrees to the vertical, and the obtuse angle A1 is 180−20=160 degrees. Various other LED disposition angles A2, for example, such as 10 degrees, may be selected in other embodiments. In one embodiment, the LEDs 125 are preferably placed as high as possible towards the top edge 152 of the PCB 147. In various embodiments, the closest the LEDs 125 may be placed to the top edge 152 of the PCB 147 is 30 thousandths of an inch due to various design considerations. Thus, according to illustrative embodiments, the proper LED angle is automatically achieved upon installation.

In some embodiments, it is also desirable to mount the LEDs 125 as close as possible to a vertical wall to which the wall piece 122 is attached and as high as possible without exposing the LEDs 125 to view when looking at a vertical wall to which the wall piece 122 is attached along a line of sight which is perpendicular to the vertical wall. In one illustrative embodiment, the dimensions in inches in FIG. 13 may be: d1=1.11, d2=0.51, d3=0.41, d4=0.20, d5=0.43, d6=1.91, and d7=0.12. These dimensions may of course vary in various applications and embodiments.

In the illustrative embodiment of FIG. 13, the cooperating parts are so shaped and dimensioned that the upper lip 191 may be inserted into the groove 188, which enables the hook 193 on the light fixture module 123 to snap into or otherwise come into engagement with the bottom hook 185 of the wall piece 122 so as to lock or retain the light fixture module 123 in a pre-determined fixed position with respect to the wall mount hanger 122. In this position, the LEDs 125 are disposed at the selected angle, for example, 20 degrees to the horizontal, as discussed above. In this manner, a tool-less interconnection and installation of the light fixture module 123 with respect to the wall piece 122 is achieved.

According to illustrative embodiments, two principles may be applied: (a) place the LEDs as high as possible in a cove (low loss, optimum light output) and (b) attach the wall piece to a wall or other surface which is a predictable structural surface for fixture mounting purposes. A predictable surface is one which an architect or designer can anticipate in advance will not be subject to changes during the construction phase which could disturb the desired lighting effect. For example, mounting techniques which propose to mount a cove lighting fixture on the floor or bottom surface of a ceiling cove can be unpredictable because the manner of construction may result in unexpected changes in dimensions or a ceiling cove bottom which is open, exposing studs and gaps between them.

FIGS. 16-20 illustrate the utility and advantages of illustrative embodiments in various applications. In the illustrative examples of FIGS. 16-20, a light fixture which employs a lens like that in FIG. 13 is used, as opposed to one with optics that would create a narrower beam such as illustrated in FIG. 9. Of course narrow beam optics could be used in other embodiments.

Figure 16:
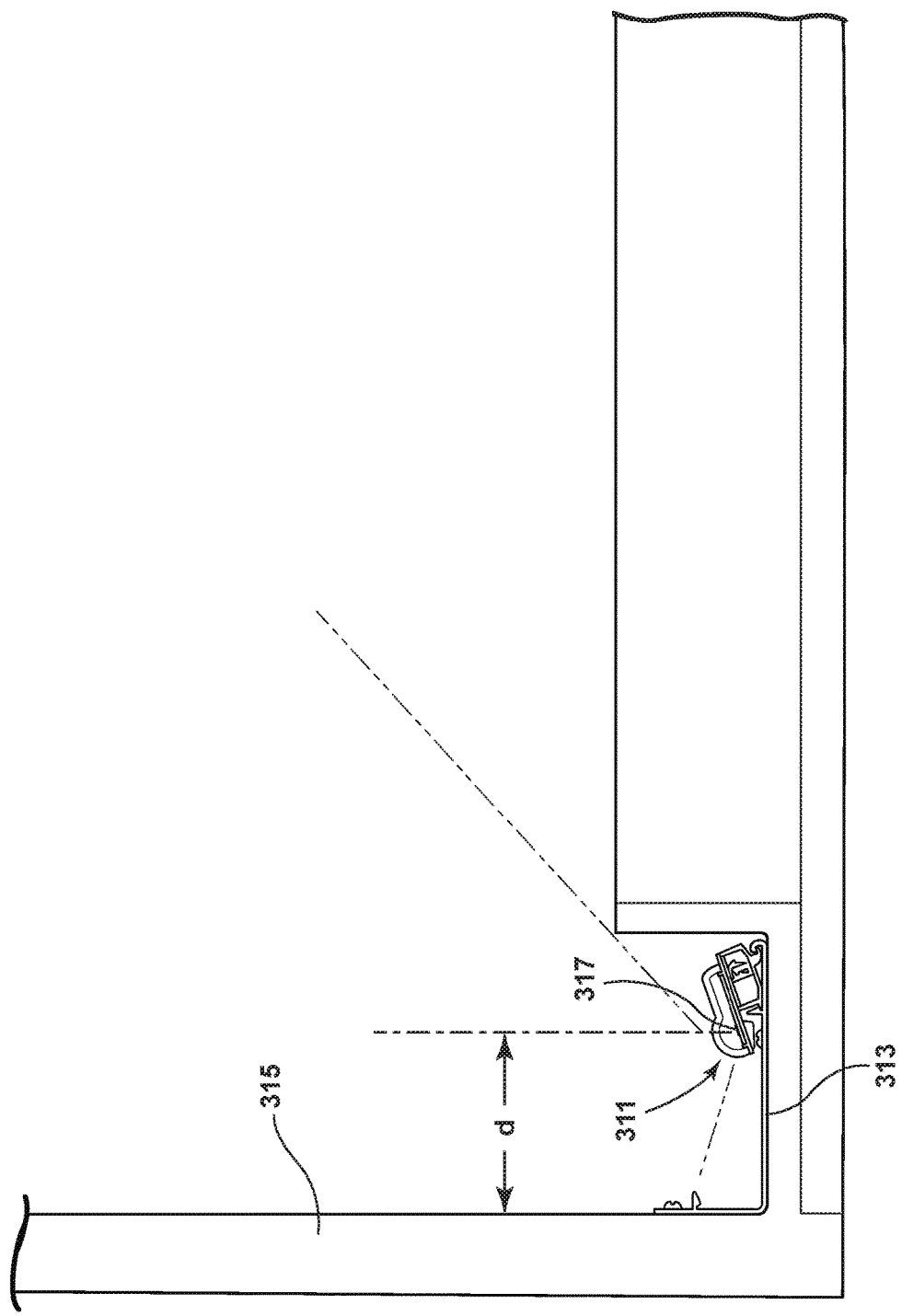
FIG. 16 is a schematic diagram illustrating a tall wall wash application of an illustrative embodiment.

FIG. 16 illustrates a tall wall wash embodiment where a light fixture 311 according to illustrative embodiments is mounted in the horizontal bottom 313 of a cove and positioned to throw light on a vertical wall 313. The LEDs 317 of the fixture 311 are positioned at a distance "d" from the vertical wall 315. Since this distance "d" can remain the same regardless of the width "w" of the cove bottom 313, reliable pre-positioning of the light fixture 311 without the need for post-installation adjustment is facilitated.

Figure 17:
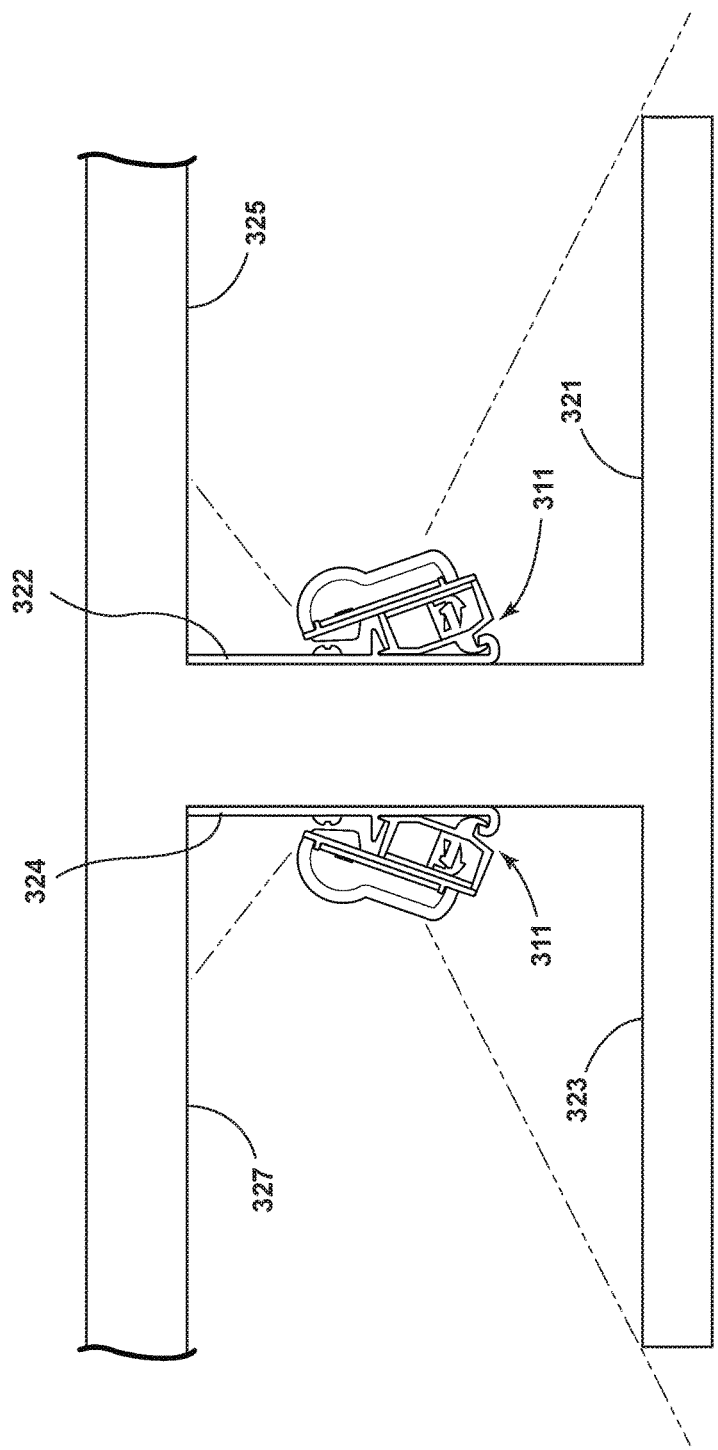
FIG. 17 is a schematic diagram illustrating a dual ceiling graze application of an illustrative embodiment.

FIG. 17 illustrates a dual ceiling graze embodiment with respective fixtures 311 disposed on respective side walls 322, 324, above respective horizontal cove walls 321, 323 to illuminate respective ceiling surfaces 325, 327. Such an embodiment might be used, for example, down the middle of the ceiling of a room.

Figure 18:
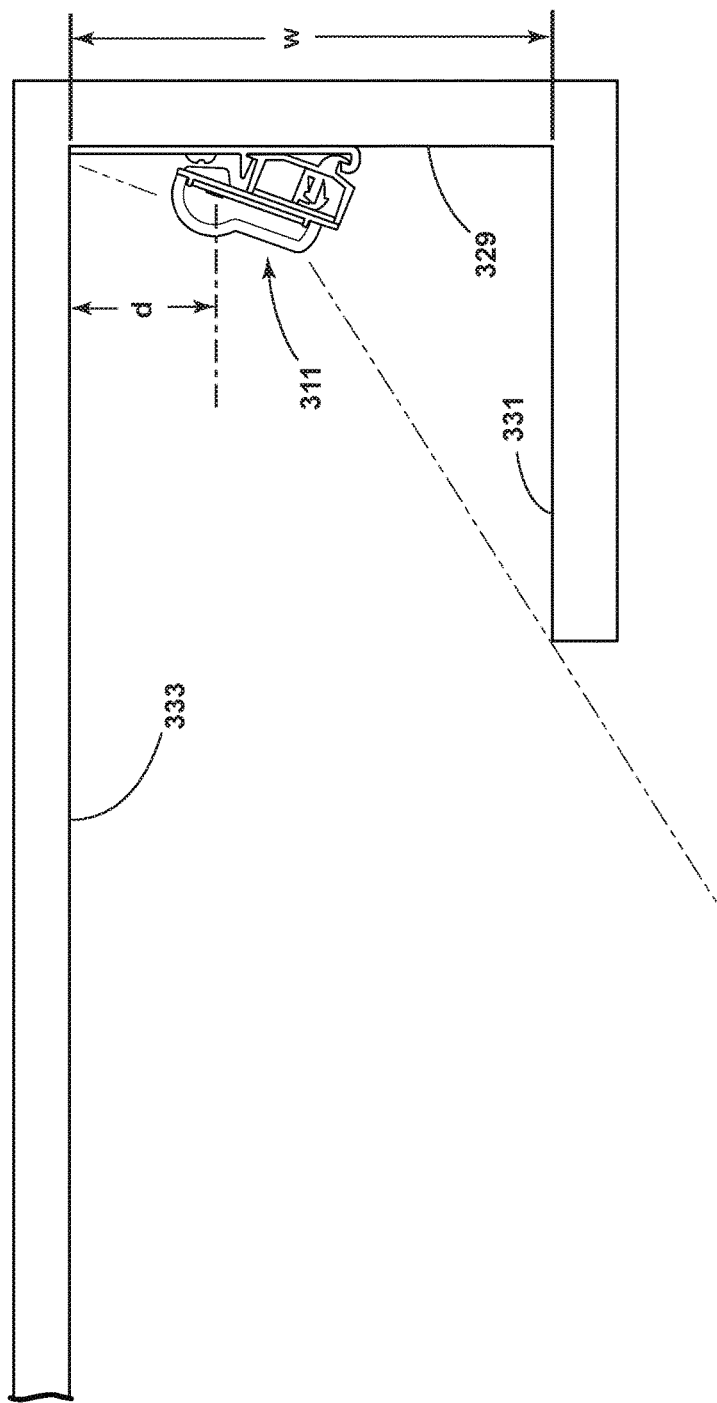
FIG. 18 is a schematic diagram illustrating a single ceiling graze application of an illustrative embodiment.

FIG. 18 show a ceiling graze embodiment where a single fixture 311 is attached to the vertical side wall 329 of a cove above a horizontal bottom cove surface 331 and positioned to illuminate a horizontal ceiling surface 333. Again, the distance "w" can be varied, while the distance "d" from the LEDs 317 to the ceiling 333 can be held constant thereby maintaining the desired light distribution, while avoiding post-installation adjustment of the position of the fixture.

Figure 19:
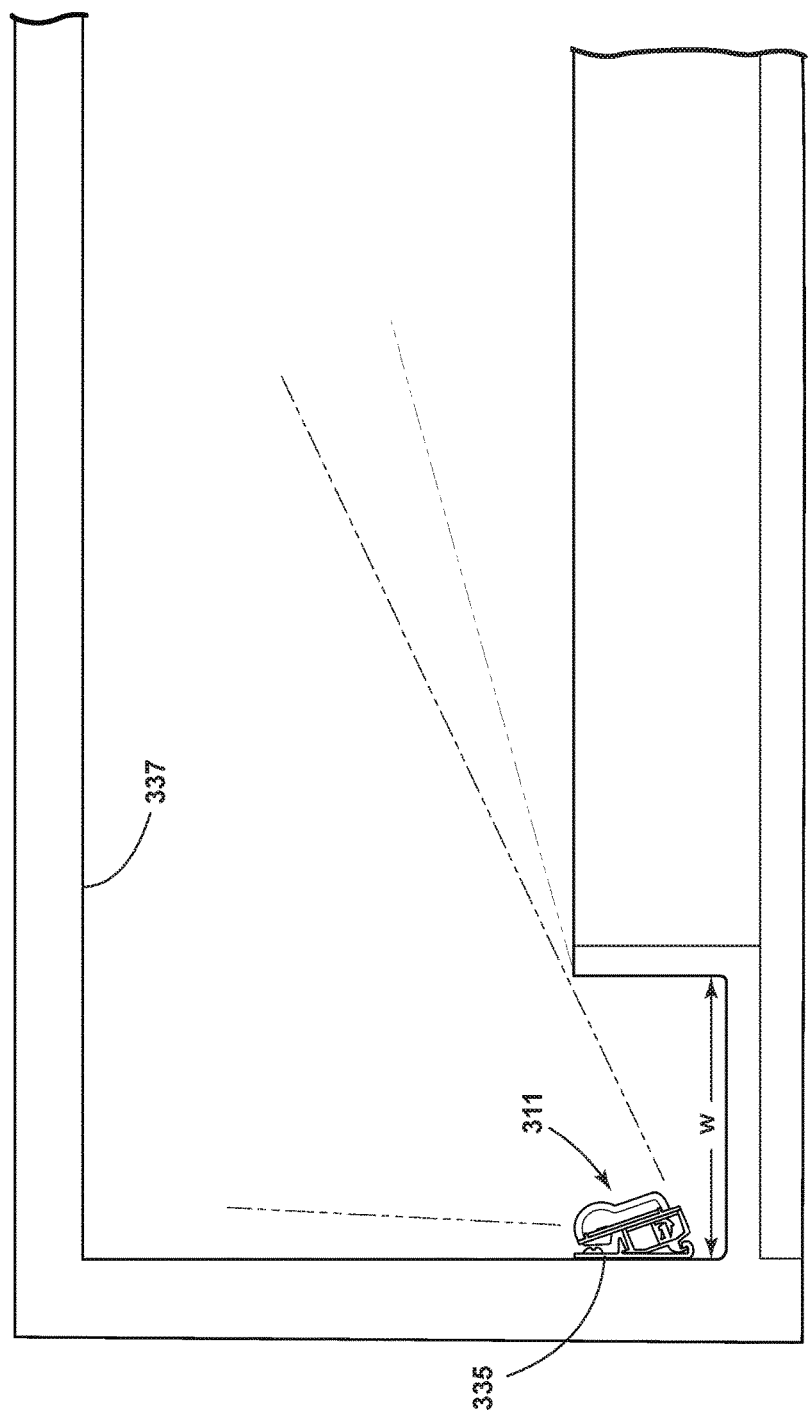
FIG. 19 is a schematic diagram illustrating an indirect ceiling cove application of an illustrative embodiment.

FIG. 19 illustrates a fixture mounted on a vertical sidewall 335 of a cove to provide indirect lighting of a horizontal ceiling 337. Again, the width "w" of the cove may vary or the bottom of the cove may be open or irregular, but the desired illumination pattern can still be achieved with the LEDs again spaced a selected fixed distance from the ceiling 337, while avoiding the need for post-installation adjustment.

Finally, FIG. 20 illustrates a wall wash embodiment where a fixture 311 is mounted in a horizontal ceiling 341 adjacent a vertical cove wall 343. Again, the distance between the vertical cove wall 343 and the wall 345 being illuminated may vary while the distance "d" between the LEDs and the wall 345 can be maintained the same so as to result in the desired pre-designed illumination pattern.

From the foregoing, those skilled in the art will appreciate that various adaptations and modifications of the just described illustrative embodiments can be configured without departing from the scope and spirit of the invention. Therefore, it is to be understood that, within the scope of the appended claims, the invention may be practiced other than as specifically described herein.

What is claimed is:

1. A method of illuminating a ceiling surface located above a cove comprising a rear cove wall and a front cove wall comprising:
   constructing a wall piece and configuring the wall piece to be attachable to the rear cove wall;
   positioning a plurality of LEDs on a circuit board beneath a light transmissive cover in a light fixture component;
   constructing the wall piece and light fixture component to be removably attachable to one another and such that, when attached, the light fixture component and the wall piece interlock such that the circuit board is fixed in position to project light from the cove toward the ceiling surface at a pre-selected fixed angle; and attaching the wall piece to the rear cove wall and behind the front cove wall at a position selected such that, when the light fixture component is attached to the wall piece, the LEDs of the light fixture component are not visible on a line of sight perpendicular to a vertical wall of a room from a point looking toward the front cove wall, the LEDs are positioned to illuminate the ceiling surface, and each of the LEDs is spaced at the same selected distance from the ceiling surface; and attaching the light fixture component to the wall piece.

2. The method of claim 1 further comprising configuring and positioning the lamp fixture component such that 85% of the light generated by the LEDs exits the cove.

3. The method of claim 1 further comprising constructing the wall piece entirely out of a non-electrically conductive material.

\* \* \* \* \*